US011816728B2

(12) United States Patent
Slowiak et al.

(10) Patent No.: US 11,816,728 B2
(45) Date of Patent: Nov. 14, 2023

(54) DIGITAL IDENTITY

(71) Applicant: Early Warning Services, LLC, Scottsdale, AZ (US)

(72) Inventors: Gregory Slowiak, Chicago, IL (US); Eric Woodward, San Francisco, CA (US); Philip Lam, San Francisco, CA (US); Jeff Shultz, Waco, TX (US)

(73) Assignee: Early Warning Services, LLC, Scottsdale, AZ (US)

(*) Notice: Subject to any disclaimer, the term of this patent is extended or adjusted under 35 U.S.C. 154(b) by 0 days.

(21) Appl. No.: 17/855,971

(22) Filed: Jul. 1, 2022

(65) Prior Publication Data

US 2022/0405838 A1    Dec. 22, 2022

Related U.S. Application Data

(63) Continuation of application No. 16/908,435, filed on Jun. 22, 2020, now Pat. No. 11,394,724.

(Continued)

(51) Int. Cl.
*G06Q 40/02* (2023.01)
*G06Q 40/03* (2023.01)
(Continued)

(52) U.S. Cl.
CPC ............. *G06Q 40/03* (2023.01); *G06F 9/445* (2013.01); *G06F 21/305* (2013.01);
(Continued)

(58) Field of Classification Search
CPC ..... H04L 63/0876; H04L 63/08; H04L 63/10; H04L 63/0815
See application file for complete search history.

(56) References Cited

U.S. PATENT DOCUMENTS 7,912,971 B1    3/2011  Dunn
10,237,259 B2   3/2019  Ronda et al.
(Continued)

FOREIGN PATENT DOCUMENTS

EP        2867814  A1 *  5/2015  ............. G06F 21/31

OTHER PUBLICATIONS

U.S. Appl. No. 16/908,435, Non-Final Office Action, dated Nov. 2, 2021, 14 pages.

(Continued)

*Primary Examiner* — Chirag R Patel
(74) *Attorney, Agent, or Firm* — KILPATRICK TOWNSEND & STOCKTON LLP

(57) ABSTRACT

Disclosed herein is an identity network that can provide a universal, digital identity for users that can be used to authenticate the user by an identity provider for relying parties. The identity network receives a request from a relying party that includes deep linking to an identity provider selected by the user. The request specifies the user as well as any other information about the user the relying party is requesting. A service of the identity network launches the application for the identity provider on the user's device using a software development kit. The user can log into the identity provider's application, which validates the user and provides the user authentication/validation and information about the user to the identity network. The identity network can then provide the indication of the user's authentication and the user information to the relying party.

17 Claims, 6 Drawing Sheets

Related U.S. Application Data

(60) Provisional application No. 62/864,911, filed on Jun. 21, 2019, provisional application No. 62/864,891, filed on Jun. 21, 2019, provisional application No. 62/864,900, filed on Jun. 21, 2019, provisional application No. 62/864,906, filed on Jun. 21, 2019, provisional application No. 62/864,889, filed on Jun. 21, 2019.

(51) Int. Cl.
  *G06F 21/30* (2013.01)
  *G06F 21/62* (2013.01)
  *H04L 67/50* (2022.01)
  *H04L 9/08* (2006.01)
  *H04L 41/147* (2022.01)
  *H04L 9/40* (2022.01)
  *G06F 9/445* (2018.01)

(52) U.S. Cl.
  CPC ........ *G06F 21/6263* (2013.01); *H04L 9/0819* (2013.01); *H04L 41/147* (2013.01); *H04L 63/0876* (2013.01); *H04L 63/0884* (2013.01); *H04L 63/126* (2013.01); *H04L 67/535* (2022.05)

(56) References Cited

U.S. PATENT DOCUMENTS

| | | | |
|---|---|---|---|
| 11,157,954 B1 | 10/2021 | Belanger et al. | |
| 11,244,034 B1 | 2/2022 | Nagappan et al. | |
| 11,328,356 B1 | 5/2022 | Slowiak et al. | |
| 11,394,724 B1 | 7/2022 | Slowiak et al. | |
| 11,438,331 B1 | 9/2022 | Slowiak et al. | |
| 11,522,701 B2 * | 12/2022 | Rowe | H04L 63/0884 |
| 2004/0236965 A1 | 11/2004 | Krohn | |
| 2010/0145861 A1 | 6/2010 | Law et al. | |
| 2010/0154046 A1 | 6/2010 | Liu et al. | |
| 2013/0036456 A1 | 2/2013 | Boysen et al. | |
| 2013/0086657 A1 * | 4/2013 | Srinivasan | H04L 9/3234 726/6 |
| 2014/0173754 A1 | 6/2014 | Barbir | |
| 2015/0058930 A1 * | 2/2015 | Mitchell | H04L 63/08 726/3 |
| 2015/0332029 A1 | 11/2015 | Coxe et al. | |
| 2017/0041296 A1 * | 2/2017 | Ford | G06F 21/64 |
| 2017/0250972 A1 * | 8/2017 | Ronda | H04L 9/0891 |
| 2018/0152440 A1 | 5/2018 | Hande et al. | |
| 2018/0181745 A1 | 6/2018 | Chen et al. | |
| 2018/0218121 A1 | 8/2018 | Gassner et al. | |
| 2018/0267847 A1 | 9/2018 | Smith et al. | |
| 2018/0349581 A1 * | 12/2018 | Ramalingam | H04L 9/0891 |
| 2019/0261169 A1 | 8/2019 | Kamal et al. | |
| 2020/0153814 A1 * | 5/2020 | Smolny | H04L 63/102 |
| 2020/0213297 A1 | 7/2020 | Suraparaju | |
| 2020/0366671 A1 | 11/2020 | Larson et al. | |
| 2021/0014218 A1 | 1/2021 | Kurylko et al. | |
| 2021/0320799 A1 | 10/2021 | Bankston | |
| 2021/0326426 A1 | 10/2021 | Bouse | |

OTHER PUBLICATIONS

U.S. Appl. No. 16/908,435, Notice of Allowance, dated Mar. 17, 2022, 7 pages.

U.S. Appl. No. 16/908,443, Non-Final Office Action, dated Nov. 9, 2021, 14 pages.

U.S. Appl. No. 17/856,056, Non-Final Office Action, dated Feb. 15, 2023, 14 pages.

* cited by examiner

DIGITAL IDENTITY

CROSS-REFERENCE TO RELATED APPLICATIONS

This application is a Continuation of U.S. application Ser. No. 16/908,435, filed Jun. 22, 2020, entitled "DIGITAL IDENTITY", the disclosure of which is incorporated by reference herein in its entirety. This application also claims the benefit of and priority to, pursuant to 35 USC § 119, U.S. Provisional Application No. 62/864,891, filed Jun. 21, 2019, entitled "DIGITAL IDENTITY," U.S. Provisional Application No. 62/864,900, filed Jun. 21, 2019, entitled "DIGITAL IDENTITY SIGN-UP," U.S. Provisional Application No. 62/864,906, entitled "DIGITAL IDENTITY SIGN-IN," U.S. Provisional Application No. 62/864,911, entitled "DIGITAL IDENTITY STEP-UP," and U.S. Provisional Application No. 62/864,889, entitled "DIGITAL IDENTITY LOCK," each of which is assigned to the assignee hereof, and each of which are incorporated herein in their entirety by reference for all purposes.

U.S. patent application Ser. No. 16/908,443, filed Jun. 22, 2020, entitled "DIGITAL IDENTITY SIGN-UP," U.S. patent application Ser. No. 16/908,453, filed Jun. 22, 2020, entitled "DIGITAL IDENTITY SIGN-IN," U.S. patent application Ser. No. 16/908,456, filed Jun. 22, 2020, entitled "DIGITAL IDENTITY STEP-UP," and U.S. patent application Ser. No. 16/908,460, filed Jun. 22, 2020, entitled "DIGITAL IDENTITY LOCK," are each incorporated by reference in their entirety for all purposes.

BACKGROUND

Most companies have an online presence today and each has information about each of its users and customers. However, authentication of a user is largely handled piecemeal by each company with little verification of the user by a trusted source. The current way that users are onboarded and authenticated lacks security, consistency, and ease of use for both the companies and the users. Additionally, current methods to perform identity verification online have considerable drawbacks in coverage, validity, and usability.

SUMMARY

Figure 1:
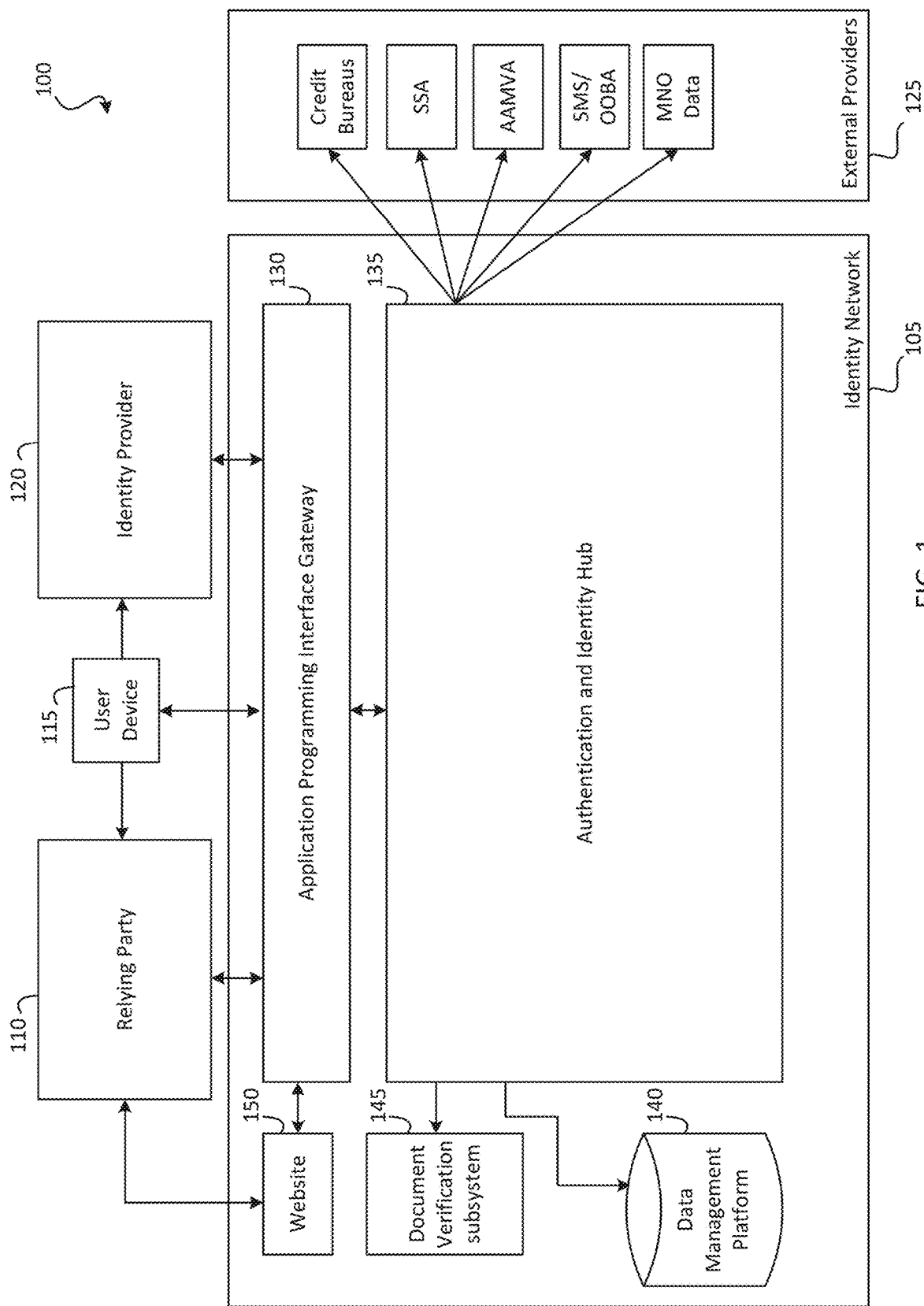
FIG. 1 illustrates an example system for providing an authenticated, universal digital identity for a user, according to an embodiment.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for providing an authenticated, universal digital identity for a user using an identity network. The identity network may receive, from a relying party, a request including deep linking to an identity provider of the identity network. The request may include an identity assertion to validate a digital identity of a user and provide information of the user. A service of the identity network on a device of the user can be used to launch an application of the identity provider. The user will be prompted to log into the identity provider application, thereby validating/authenticating the user by the identity provider. The identity network can receive, from the identity provider, validation of the digital identity of the user based on the authentication of the user through the identity provider application. The identity network can also receive at least a portion of the information of the user. The validation and the user information may be encrypted with a cryptographic key. In response to receiving the validation, the identity network may transmit the encrypted validation of the digital identity of the user and the user information to the relying party. Other embodiments of this aspect include corresponding computer systems, apparatus, and computer programs recorded on one or more computer storage devices, each configured to perform the actions of the methods.

Implementations may include one or more of the following features. The identity network may obtain, via the application of the identity provider, consent of the user to provide the information of the user to the relying party. The identity network may obtain additional user information not provided by the identity provider but requested by the relying party from a third party and transmit the additional user information with the encrypted validation of the digital identity to the relying party. The identity network may enroll multiple relying parties to use the identity network. The identity network may enroll multiple identity providers to support the identity network. Enrolling the identity providers may include providing a software development kit from the identity network to each of the identity providers for integration into the respective applications of the identity providers. Optionally, the validation of the digital identity of the user includes confirmation that the user was successfully authenticated by the application of the first identity provider in response to launching the identity provider's application. The identity network may assign a device identifier to the user's device. The identity network may track activity of the user's device with the identity network using the device identifier. The identity network may identify suspicious activity of the user's device based on modelling the tracked activity of the device. The identity network may transmit an indication of the suspicious activity to the relying party with the encrypted validation of the digital identity. Implementations of the described techniques may include hardware, a method or process, or computer software on a computer-accessible medium.

DETAILED DESCRIPTION

The explosion of online user activity and data over the past decades have resulted in a disparate system in which most online companies have developed their own systems for users to sign up, sign in, and utilize their services.

Authentication of users is often difficult to ensure that online identity theft and other sinister activities are avoided. Further, the process for creation of new accounts and tracking of countless passwords for users is tedious.

To solve the problem of invalid authentication and password security for users, described herein is a system for an authenticated, universal digital identity that a user may use to create new accounts, login to existing accounts, and ensure for companies that the user is an authenticated user based on the user's digital identity. A digital identity can be created and used to consistently and accurately authenticate a user. The technical problem faced by many online companies is that a user may provide information to create an account, and the company has no way to verify or authenticate the new user. Companies cannot be sure that existing users are verified other than through their own password systems, which suffer from password theft issues and invalid initial sign up. Accordingly, the technical solution described herein provides a consistent and technical way for the company to authenticate the user using a universal online digital identity.

Users often have a trusted relationship with their banks, and banks are regulated so certain precautions are taken by banks to ensure the user is a legitimate and authenticated user. Banks and other providers that have regulated processes for identifying users may be used to authenticate users with a digital identity authentication and provide information on the users for relying companies by becoming an identity provider in the disclosed identity network. Relying companies, such as insurance companies, retailers, and so forth can enroll with the identity network to gain the benefit of the identity provider authenticating the digital identity of users and customers. The identity network can broker authentication and information exchange using cryptographic technology and other verifiable methods between the relying party and the identity provider. Additional technological value can be provided by the identity network, which can oversee and identify suspicious activity overall for a device or user given their online activities associated with any identity provider, obtain information from various third parties for the relying party to further validate the user, and so forth.

FIG. 1 illustrates an example digital identity system 100 for authenticated, universal digital identities for users. System 100 includes an identity network 105, relying party 110, user device 115, identity provider 120, and external providers 125. Components or functionality described may be combined into fewer components or expanded into more components without departing from the scope of the invention.

Identity network 105 may include a network of one or more computers, such as computing device 600. The identity network 105 may include application programming interface gateway 130, authentication and identity hub 135, data management platform 140, document verification subsystem 145, and website 150. Identity network 105 may include other components or functionality than discussed or functionality may be combined into fewer or more components without departing from the scope of the invention. Identity network 105 provides the functionality to broker authentication and information exchange between the relying party 110 and the identity provider 120 as discussed in more detail herein.

Application programming interface gateway 130 provides a gateway for the relying party 110, user device 115, identity provider 120, and the website 150 to interact with the authentication and identity hub 135. The authentication and identity hub 135 interfaces between various components and collects information needed for identity assertions. For example, authentication and identity hub 135 may collect information from external providers 125 including, for example, credit bureaus, the social security administration, the American association of motor vehicle administrators, and other external providers that utilize out-of-band authentication (e.g., secure message service out-of-band authentication), and/or mobile network operator data. Various data from external providers may be used depending on the request from the relying party 110, which will be described in greater detail with respect to FIG. 2.

Authentication and identity hub 135 also interfaces with the document verification subsystem 145 for verifying documents. The document verification subsystem 145 may be a third party subsystem or may interface with a third party subsystem in some embodiments. The authentication and identity hub 135 may interface with the document verification subsystem 145 using an application programming interface. The document verification subsystem enables the identity network 105 to request a standard identity document from an end user on user device 115. The standard identity document may be, for example, a driver license, state-issued identification, or country-issued passport. The document verification subsystem 145 can validate the document presented by the user is a legitimate document, that the identity attributes match those of the identity provider 120 for the given user, and that the document photo matches the end user holding the document. The document verification subsystem 145 can also verify data submitted by an end user against data found on authoritative documents such as a state issued driver license or a United States Passport, for example. In some embodiments, when a user submits data or information using user device 115, the authentication and identity hub 135 may provide the data to the document verification subsystem 145 in conjunction with information from an external provider 125. The document verification subsystem 145 can extract information from the documents provided from the external providers 125 and compare it to the data the user provided. For example, the user may provide a driver license number, and the document verification subsystem 145 may extract the user's driver license number from the user's driver license obtained from an external provider 125 (e.g., the state department of motor vehicles) and compare the two values to ensure the user entered data is accurate.

Authentication and identity hub 135 also interfaces with data management platform 140. Data management platform 140 can provide, for example, identity reputation scores and/or device reputation information. For example, the identity network 105 may identify based on a common device id (described in more detail with respect to FIG. 4) activity of a device at one or more identity providers 120 and/or one or more relying parties 110. This activity can be modelled and compared to models that may indicate whether the activity the device is engaging in is suspicious. If suspicious activity is detected, new requests may be flagged for the relying party 110 requesting the information or authentication. Similar to device reputation, identity reputation models capture network behavior of a given user to determine inconsistencies that correlate to potential fraud. The identity reputation and/or the device reputation information may be used to generate an identity confidence score used to help a relying party determine if the confidence is sufficient to proceed with the relying party use of the digital identity or if the relying party may instead, for example, require additional authentication information from the user.

The authentication and identity hub 135 can interface with the data management platform 140 using an application programming interface.

Website 150 may be an internet interface provided by identity network 105 that a relying party 110 may redirect the end user, for example, to select their identity provider 120 when a request is initiated. Website 150 may redirect the user to their identity provider 120 website or mobile application via a matrix barcode (e.g., a QR code), a deep link, a website link, or via a short message service (SMS) or mobile push notification. In some embodiments, the relying party 110 may include a software development kit from the identity network 105 that is used to redirect the user to the website 150 to select the user's identity provider 120 when a request is initiated.

Authentication and identity hub 135 may communicate digital identity data that is obtained from the identity provider 120 to the relying party 110 when the identity network 105 fulfills an identity assertion. An identity assertion may be an authentication request in which the relying party 110 requests that the identity provider 120 validate or authenticate the digital identity of the user. The authentication request is sent to the identity network 105 from the relying party 110 and forwarded to the identity provider 120 by the identity network 105.

Data management platform 140 is used to provide ledger functionality (e.g., distributed or non-distributed ledger or hyper ledger functionality) to identity network 105. The ledger may store a registered identifier for each user registered to a particular identity provider 120. It may also be used to create a record of instance of the sharing of identity attributes from identity provider 120 to a relying party 110 on behalf of an end user. Each request and response for authentication and digital identity data may be passed through the authentication and identity hub 135 to store every transaction in the ledger.

Digital identity data may be provided from the identity provider 120 to the authentication and identity hub 135. The hub may provide the digital identity information to the relying party 110.

Relying party 110 may be any company that would like to be able to authenticate the digital identity of a user. Examples of relying parties 110 include insurance companies, retailers, travel companies (e.g., airlines, hotels, cruise lines), and the like. While only a single relying party 110 is depicted in FIG. 1 for the sake of simplicity of explanation, any number of relying parties 110 may be included in system 100.

Figure 6:
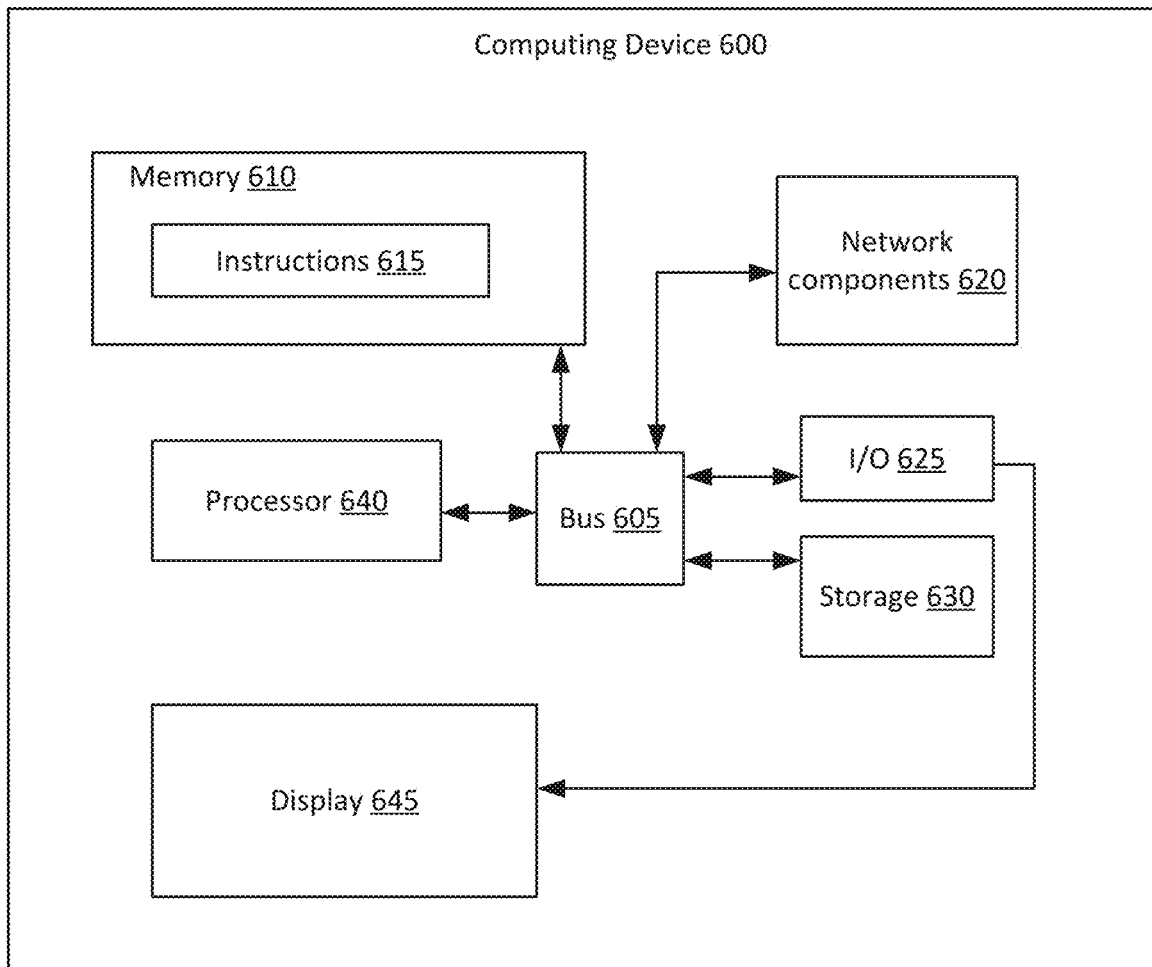
FIG. 6 illustrates an example computer system.

User device 115 may be any suitable computing device, such as computing device 600 as depicted and described with respect to FIG. 6, of a user. For example, user device 115 may be a laptop, smartphone, desktop computer, tablet, smartwatch, and the like. While only a single user device 115 is depicted in FIG. 1 for the sake of simplicity of explanation, any number of user devices 115 may be included in system 100.

Identity provider 120 may be any suitable company that can authenticate a user having user device 115 for relying party 110. Identity provider 120 may include, for example, financial institutions. Identity provider 120 may have detailed information and have verified the identity of the user of user device 115 because, for example, financial institutions are regulated by the government with respect to identifying customers with specificity. While only a single identity provider 120 is depicted in FIG. 1 for the sake of simplicity of explanation, any number of identity providers 120 may be included in system 100.

In use, a user may access a relying party 110 website using the user device 115. For example, the user may wish to initiate a new relationship with the relying party 110 to, for example, become a customer of the relying party 110. The relying party 110 may request digital identity authentication and information for the user of user device 115 from the identity network 105 via website 150. In some embodiments, user device 115 may access a mobile application of relying party 110. The mobile application may access website 150 with an identity assertion. The identity assertion may be a request to authenticate the digital identity of the user and, in some cases, request additional information about the user. In response, the website 150 may provide a list of identity providers 120 for the user to select for authenticating the user's digital identity. The list may include many identity providers 120, and the user should select an identity provider with which the user has a relationship. For example, if the user is a customer of BankA, and BankA is an identity provider in the list, the user may select BankA as the identity provider for authenticating that user's digital identity. If the user has a relationship with multiple identity providers 120, the user may select any one of the identity providers 120 with which the user has a relationship. Once the user selects an identity provider 120, the application programming interface gateway 130 may receive the identity assertion including requested data about the user and the selected identity provider 120 and provide the entire request to the authentication and identity hub 135. The authentication and identity hub 135 may then provide the identity assertion to the identity provider 120. The identity provider 120 can authenticate the digital identity of the user and provide the requested information via the application programming interface gateway 130 to the authentication and identity hub 135. The authentication and identity hub 135 may obtain other information requested by the relying party 110 but not included from the identity provider 120. The authentication and identity hub 135 may request and obtain the information from the external providers 125, for example. Once the information is complete, the authentication and identity hub 135 may provide the information and acknowledgement of the authentication of the user's digital identity to the relying party 110. If the identity provider 120 cannot authenticate the digital identity of the user, the identity provider 120 can provide such failed authentication notice to the authentication and identity hub 135, and the authentication and identity hub 135 can inform the relying party 110 of the failed authentication.

Figure 2:
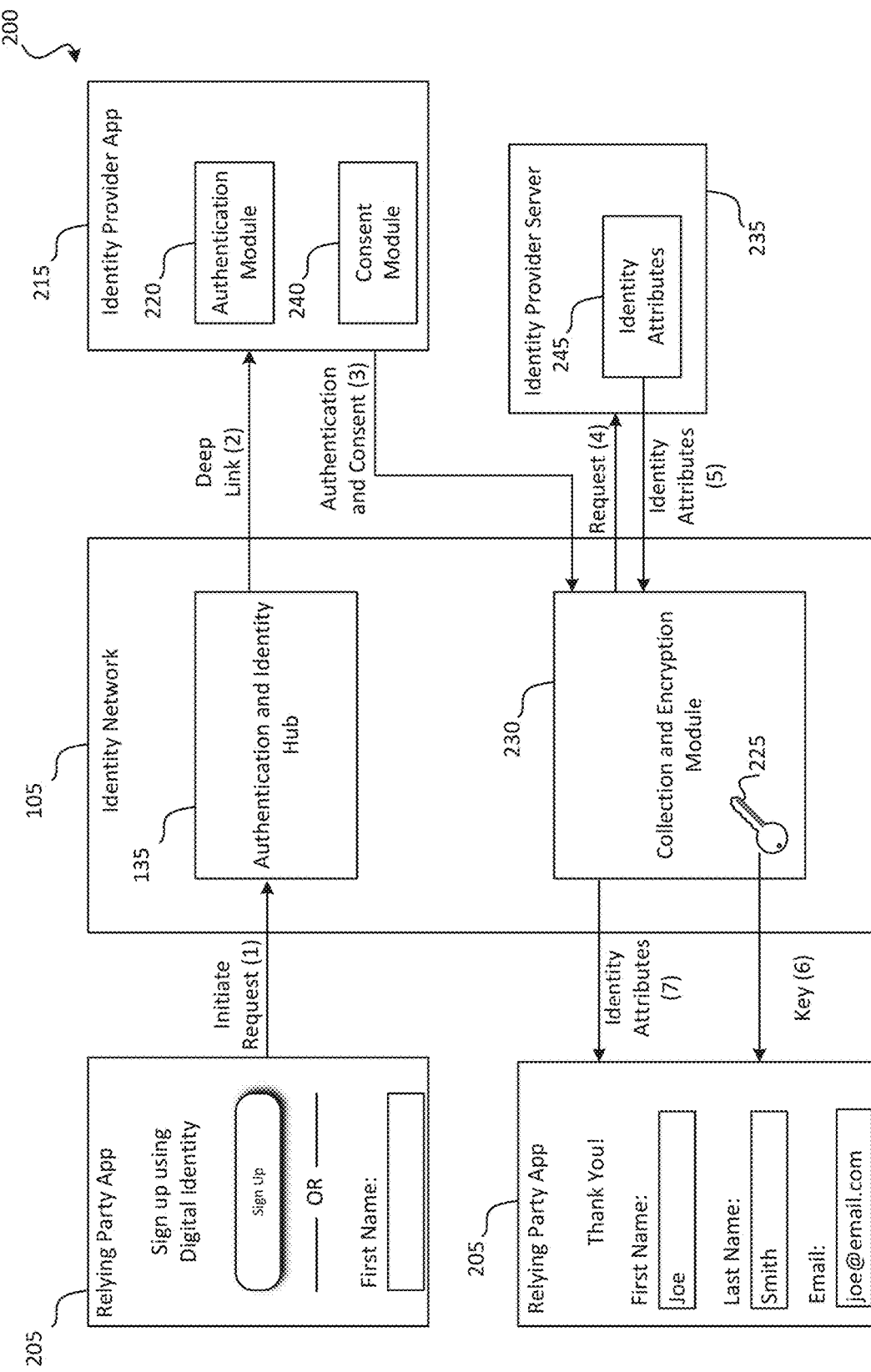
FIG. 2 illustrates an example data information flow using an authenticated, universal digital identity for a user, according to an embodiment.

FIG. 2 illustrates an example data flow 200 of data through an authenticated, universal digital identity system. The data flow 200 includes the relying party application 205, the identity network 105, the identity provider application 215, and the identity provider server 235. Starting with the relying party application 205, the user may decide to sign up for access to the relying party using the user's universal digital identity. The request (Initiate Request (1)) is initiated to the authentication and identity hub 135 of the identity network 105. In some embodiments, the identity network 105 may provide a list of identity providers for the user to select from. Once the identity provider is selected, the authentication and identity hub 135 identifies a token associated with the user for the selected identity provider. In some embodiments, the authentication and identity hub 135 may use a user provided token to look up the associated identity provider. For example, when the user signs up and requests an identity provider 120 to authenticate the user, a token may be received and saved in the authentication and identity hub 135 for the user/identity provider relationship so that upon later requests to authenticate, the token can be identified in the authentication and identity hub 135 and the same identity provider used. In some embodiments, the token is provided by the user with the selection of the identity provider, in some embodiments, the identity provider may provide the token upon first request by the identity network 105 to authenticate the user with the identity provider, or in some embodiments, the identity network may generate a token for storing the user/identity provider relationship. Deep linking is used on the user's device to launch the identity provider application 215 (Deep Link (2)). In the identity provider application 215, the user logs into their account and is subsequently authenticated with authentication module 220. The identity provider application 215 may provide the consent information to the user via a user interface providing the user with the information the identity network 105 and identity provider 120 intend to provide to the relying party 110 using the consent module 240. The user may provide consent or decline consent. If consent is declined, the process flow halts and nothing further happens, or perhaps a failure message is sent to the relying party application 205 to notify it that the identity provider 120 will not be validating/authenticating the digital identity of the user. If the user provides consent, the authentication and consent are provided to the collection and encryption module 230 of the identity network 105 (Authentication and Consent (3)). In some embodiments, the consent and authentication are encrypted by the identity provider, and the encrypted validation of authentication and the encrypted consent information are provided to the identity network.

The collection and encryption module 230, upon receiving the authentication and consent, sends a request to the identity provider server 235 to obtain the identity attributes 245 of the user (Request (4)). The identity attributes 245 include the information about the user that may have been requested by the relying party application 205 in the initial request. The Request (4), including a session identifier and an authentication token, is transmitted through the identity network 105 to the identity provider server 235.

The identity provider server 235 provides the identity attributes 245 to the collection and encryption module 230 of the identity network 105 (Identity Attributes (5)). Collection and encryption module 230 may be a submodule of authentication and identity hub 135 as described with respect to FIG. 1. In some embodiments, the identity provider server 235 may encrypt the identity attributes 245 before transmission to the identity network 105. In such embodiments, the encryption key 225 may be provided to the identity network 105 and/or the relying party application 205 from the identity provider server 235.

The collection and encryption module 230 may encrypt the identity attributes 245 with an encryption key 225 if the identity provider server 235 did not previously encrypt the identity attributes 245. The key used for encryption of the identity attributes will be unique per transaction and be shared with the relying party by encrypting it such that only the relying party can decrypt this unique transaction encryption key. The key 225 is provided to the relying party application 205 (Key (6)).

The collection and encryption module 230 may provide the encrypted identity attributes 245 to the relying party application 205 (Identity Attributes (7)). The relying party application 205 can use the encryption key 225 to decrypt the identity attributes 245 and populate the user's information into the relying party application 205 form.

In some embodiments, the user has requested to use a digital identity authentication to apply for a new account with a relying party such as an insurance company. The insurance company may initially request authentication of the user and provision of the user's first and last name, residential address, email address, telephone number, and credit score. The identity provider may be, for example, the user's primary bank that holds the user's checking and savings account. The identity attributes may then include the user's first and last name, residential address, email address, telephone number, and credit score. In some embodiments, the user's credit score, for example, may not come from the identity provider but instead an external provider, such as a credit bureau. In such embodiments, collection and encryption module 230 may collect the credit score from the credit bureau and add the credit score to the other identity attributes 245. Once received at the relying party application 205, the identity attributes 245 may be filled into the relying party application form, as shown in part in FIG. 2.

Figure 3:
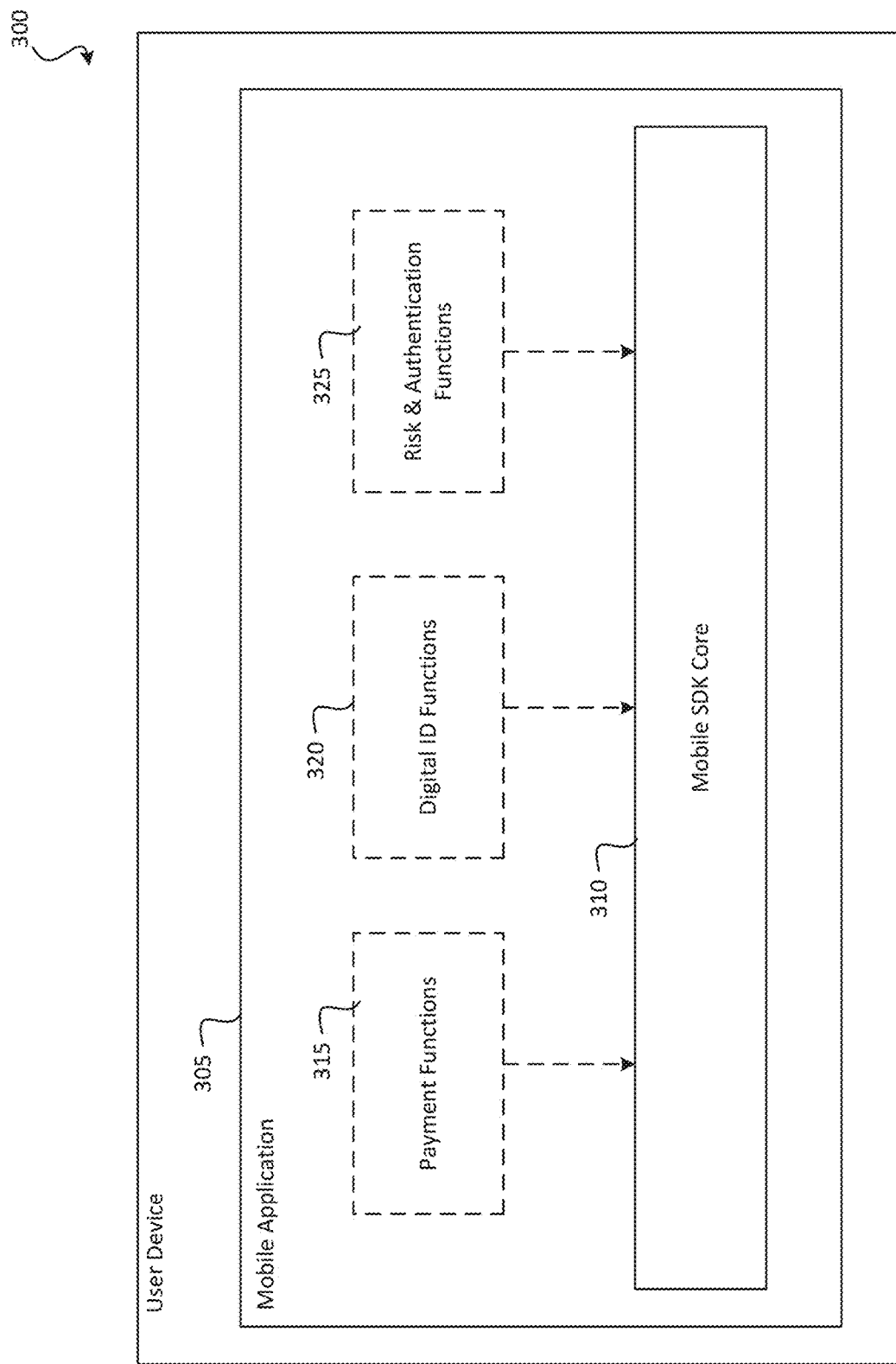
FIG. 3 illustrates an example software configuration for a mobile application enrolled in the authenticated, universal digital identity system, according to an embodiment.

FIG. 3 illustrates an example user device 300 having the identity network mobile software development kit core 310. The software development kit core 310 provides core functionality for identity network functionality. The software development kit core 310 may be included within a mobile application 305, such as a relying party application or an identity provider application.

The software development kit core 310 is lightweight (e.g., one to two (1-2) megabytes) and may be constructed in native C++. The software development kit core 310 can provide functionality including passive authentication public key infrastructure functionality to allow a user to passively authenticate. Functionality may also include device health information access modules for determining the health of the user device 300. Functionality may also include active authentication (e.g., password, biometrics, token, and the like) functionality for authenticating the user with the mobile application 305. Functionality may also include user interface kit theming to ensure the look of pages provided by the mobile application 305 for the identity network have a theme approved by the identity network. Functionality may also include secure messaging (e.g., strong cryptography) for communication with the identity network. Functionality may also include core initialization, software development kit licensing, and device identification and validation functionality for incorporating the identity network functionality into the mobile application 305.

Additional plug-in functionality or modules may be optionally included or attached to the software development kit core 310. The additional plug-ins may include payment functions module 315, digital identification function module 320, and risk and authentication function module 325. The payment functions module 315 may include functionality for features including, for example, tap-to-pay on the mobile device, send/receive/split payment functionality, and the like. The digital identification function module 320 may include functionality such as enrollment and providing terms and conditions for enrolling in the identity network, tap-to-share the user's digital identifier, and identity history for the digital identifier. The risk and authentication function module 325 may include functionality such as identification of suspicious activity and scoring for a device based on a device identifier as described in more detail with respect to FIG. 4. Functionality may also include document scanning and verification as well as fast id online (FIDO) authentication.

For an identity provider, the integration of the software development kit into the provider's mobile application or website application includes various functionality. For example, the software development kit functionality includes taking over the user interface of the provider's application to request consent from the user to use the digital identity network. Without consent, the other operations that may be invoked from the software development kit will fail with a status code indicating that the consent must be completed. The software development kit also includes device binding to the identity provider which is a certificate binding between the software development kit within the identity provider's application and identity provider. The identity provider connectivity to the identity network is included in the functionality of the software development kit including the ability to send and receive application programming interface messages to and from the identity network (e.g., send messages to and from application programming interface gateway 130 of identity network 105 of FIG. 1). The software development kit functionality may also include build settings and library/framework import.

For a relying party, the integration of the software development kit into the relying party's mobile application or website application includes various, but different functionality than that for the identity provider. For example, the ability to start a sign up or a sign in using a digital ID of the user is created using the software development kit. The ability to redirect or launch an identity provider mobile application is included in the software development kit, and the relying party callback information is provided as a parameter in the redirect so that the relying party application regains control once authentication has completed. The software development kit for the relying party also includes the ability to send and receive application programming interface messages to and from the identity network (e.g., send messages to and from application programming interface gateway 130 of identity network 105 of FIG. 1). The software development kit may also provide application design for integration so that incorporation of the implementation of the functionality is seamless and the user does not see extreme differences in themes when the software development kit functionality is operating.

Figure 4:
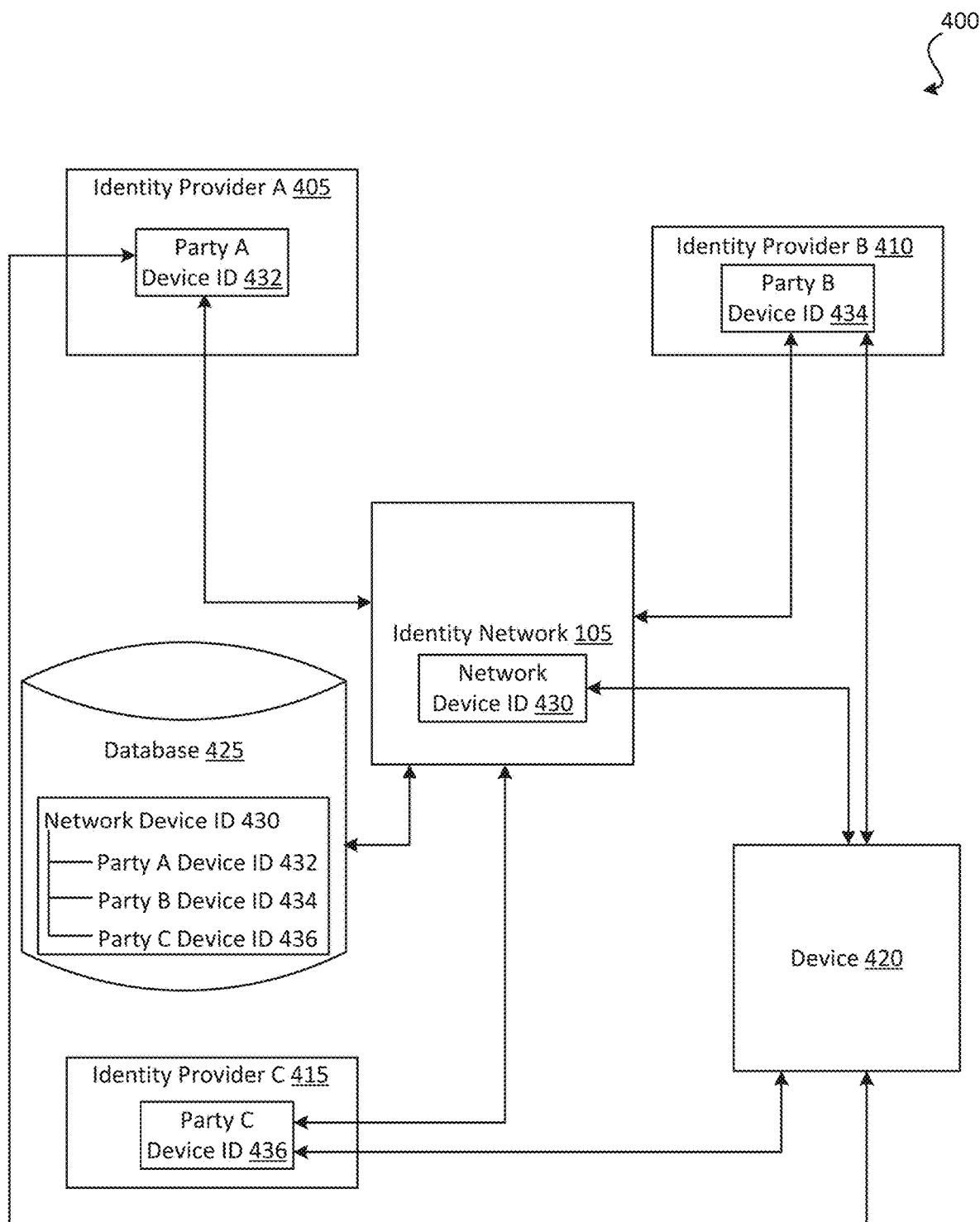
FIG. 4 illustrates an example common identifier data flow for identifying suspicious activity of a digital identity, according to an embodiment.

FIG. 4 illustrates a system 400 showing common device identifiers for a device 420, which can be used by the identity network 105 to identify, for example, suspicious activity of the device 420. The identity network 105 may have access to information about transactions of device 420 across many identity providers while each individual identity provider (405, 410, and 415) only has access to interactions with that identity provider. The identity network 105 has a more universal view that can be used as a benefit to both the identity providers and the user of the device 420. System 400 includes identity provider A 405, identity provider B 410, identity provider C 415, device 420, identity network 105, and database 425. While only three identity providers are depicted in FIG. 4, any number of identity providers may be included in system 400. Further, while a single device 420 is depicted, system 400 may include any number of devices. Additionally, while identity providers are listed, relying parties may also be included in addition to identity providers.

Identity providers A 405, B 410, and C 415 may each be a company subscribed to the identity network such as a relying party (e.g., relying party 110) or an identity provider (e.g., identity provider 120). For each identity provider 405, 410, and 415, the device 420 may have a device ID. For example, identity provider A 405 has assigned device 420 a locally unique identifier Party A Device ID 432. A different device will have a different device ID with identity provider A 405 than party A device ID 432. Similarly, identity provider B 410 may have assigned device 420 party B device ID 434, and identity provider C 415 may have assigned device 420 party C device ID 436. In this way, any activity performed between device 420 and identity provider A 405 will include party A device ID 432, any activity performed between device 420 and identity provider B 410 will include party B device ID 434, and any activity performed between device 420 and identity provider C 415 will include party C device ID 436.

Identity network 105 also has a unique device ID assigned to device 420. Network device ID 430 is the device ID assigned to device 420 by identity network 105. Any activity performed between identity network 105 and device 420 will include network device ID 430. Further, identity network 105 stores information in database 425 that links party A device ID 432, party B device ID 434, and party C device ID 436 with network device ID 430 so that identity network 105 may identify all known activity of device 420 to that single device 420.

In this way, when identity provider A 405 communicates with identity network 105 about an interaction with device 420, the information can include party A device ID 432. Identity network 105 can access database 425 to identify network device ID 430 based on the received party A device ID 432.

Identity network 105 may develop models of suspicious and normal activity for various users based on demographic and/or other data. Because identity network 105 can review all activity of device 420 with identity providers, the suspicious and normal activity models can be applied to the activity of device 420 to determine whether the device 420 activity is suspicious. If suspicious, identity network 105 can send an alert to the identity provider that may be interacting with device 420 currently or previously. Perhaps, for example, device 420 is a user's smartphone. If the user's smartphone is stolen and the thief accesses the user's accounts to make excessive purchases or transfer money out of the user's bank accounts, identity network 105 may identify the suspicious activity and notify identity providers that may be interacting with device 420. This not only protects the identity providers but the user as well from this type of criminal activity.

Figure 5:
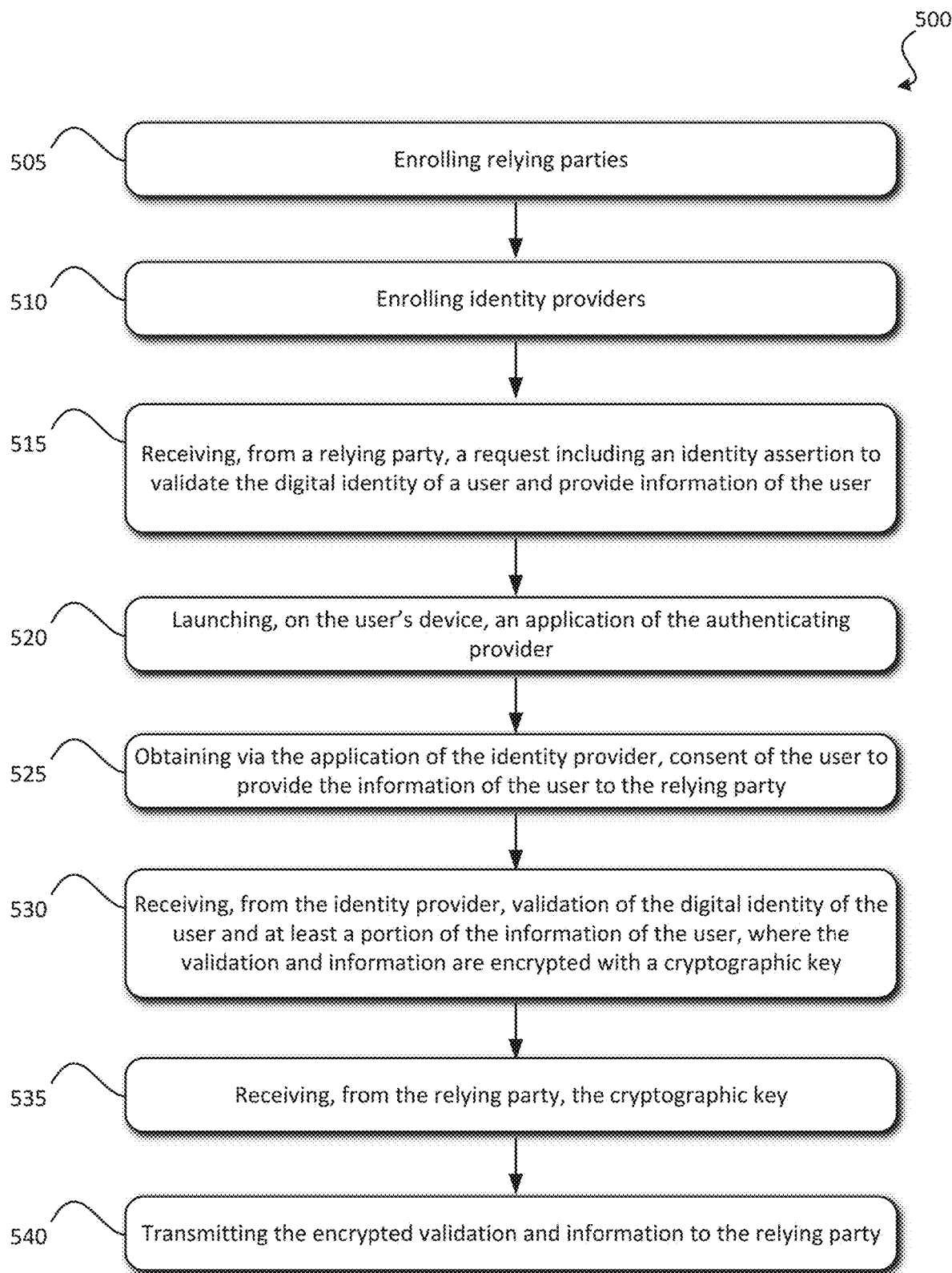
FIG. 5 illustrates an example method for providing an authenticated, universal digital identity for a user, according to an embodiment.

FIG. 5 illustrates a method 500 for providing an authenticated, universal digital identity for a user. Method 500 may be performed by, for example, identity network 105. The method 500 begins with enrolling relying parties at step 505. Relying parties may be any company that may utilize the identity network to authenticate users for signing up for the company's products or services, signing into the company's website, providing additional information on a user, and the like. Example relying parties may include insurance companies, payroll companies, retailers, service providers, and the like. Enrolling a relying party includes integrating a software development kit provided by the identity network into the relying party's mobile application and/or website application. The software development kit incorporation into the identity provider's application includes functionality that is described in more detail with respect to FIG. 3.

At step 510, the identity network enrolls identity providers. Enrolling in the identity network includes integrating the software development kit provided by the identity network into the identity provider's mobile application and/or their website application. The software development kit incorporation into the identity provider's application includes functionality that is described in more detail with respect to FIG. 3. For example, the software development kit functionality includes taking over the user interface of the application to request consent from the user to use the digital identity network. Without consent, the other operations that may be invoked from the software development kit may fail with a status code indicating that the consent must be completed. The software development kit also includes device binding to the identity provider which is a certificate binding between the software development kit within the identity provider's application and identity provider. The identity providers may include any identity provider such as, for example, a bank or other financial institution. The identity providers may provide, for example, authenticating of a digital identity of a user as well as information about the user including, for example, their name, address, income, bank account balance, and so forth.

At step 515, the identity network receives, from a relying party, a request that includes the requested identity attributes for a user that desires to use the identity network to authenticate. In some embodiments, the identity network may provide a web site for the end user to be directed to in order to see a list of available identity providers displayed as deep links for mobile applications or web site redirect links to the identity provider application. Once selected, the deep link or redirect link will launch the identity provider's mobile application with the deep link details. The identity provider application will authenticate the user by having the user log into the identity provider application, for example. When the user logs into their account with the identity provider, the identity provider authenticates the user and may provide confirmation to the identity network that the user was properly authenticated.

At step 520, the identity network's software development kit in the relying party application launches the identity provider's application using the deep link. In some embodiments, the relying party application is a mobile application on a user device. In such embodiments, the identity provider's mobile application is launched using a deep link. In other embodiments, the relying party application is a website application. In such embodiments, the identity provider's website may be launched in a new browser window.

At step 525, the identity network obtains, via the identity provider's application, consent from the user to provide the information of the user to the relying party. For example, once the identity provider's application launches, the identity network software development kit may launch a consent screen within the identity provider's application. The consent screen may request consent from the user to provide the requested information to the relying party. The user may provide consent or decline consent. If declining consent, the method 500 ends. If the user provides consent, the method 500 continues to step 530.

At step 530, the identity network receives authentication of the digital identity of the user and at least a portion of the information of the user that the relying party requested. In some embodiments, the identity provider may not have all of the information the relying party requested. In such embodiments, the identity provider may provide the requested information that it does have, and the identity network may access external providers to obtain the remaining requested information, if possible. The received authentication and information of the user from the identity provider is encrypted with a cryptographic key. In some embodiments, the identity network may obtain additional information to add to the encrypted information. The identity network may not have the cryptographic key, so additional information may be added and then encrypted with a second cryptographic key such that the relying party will need both cryptographic keys to access all of the information.

At step 535, the identity network may receive the cryptographic key from the relying party. Receiving the key from the relying party confirms to the identity network that the relying party is authorized by the identity provider and/or the user to access the authentication and information. In some embodiments, the identity network may use the cryptographic key to decrypt the authentication and information. In some embodiments, when additional information is needed to respond to the relying party request, the identity network may obtain the additional information from external providers and add it to the authentication and information from the identity provider and use the cryptographic key to encrypt all of the information and the authentication.

At step 540, the identity network transmits the encrypted authentication and information to the relying party. The relying party may use the cryptographic key that it has received from the identity provider to decrypt the information and authentication. In some embodiments, the identity network may decrypt the information and authentication on behalf of the relying party.

FIG. 6 illustrates a block diagram of an example computer system 600 usable for performing image analysis, normalization, and display. The computing device 600 can be or include, for example, a laptop computer, desktop computer, tablet, e-reader, smart phone or mobile device, smart watch, personal data assistant (PDA), or other electronic device.

The computing device 600 can include a processor 640 interfaced with other hardware via a bus 605. A memory 610, which can include any suitable tangible (and non-transitory) computer readable medium, such as RAM, ROM, EEPROM, or the like, can embody program components (e.g., instructions 615) that configure operation of the computing device 600. In some examples, the computing device 600 can include input/output ("I/O") interface components 625 (e.g., for interfacing with a display 645, keyboard, or mouse) and additional storage 630.

The computing device 600 can include network components 620. Network components 620 can represent one or more of any components that facilitate a network connection. In some examples, the network components 620 can facilitate a wireless connection and include wireless interfaces such as IEEE 802.11, Bluetooth, or radio interfaces for accessing cellular telephone networks (e.g., a transceiver/antenna for accessing CDMA, GSM, UMTS, or other mobile communications network). In other examples, the network components 620 can be wired and can include interfaces such as Ethernet, USB, or IEEE 1394.

Although FIG. 6 depicts a single computing device 600 with a single processor 640, the system can include any number of computing devices 600 and any number of processors 640. For example, multiple computing devices 600 or multiple processors 640 can be distributed over a wired or wireless network (e.g., a Wide Area Network, Local Area Network, or the Internet). The multiple computing devices 600 or multiple processors 640 can perform any of the steps of the present disclosure individually or in coordination with one another.

Each of the instructions, calculations, or operations described herein may be performed using a computer or other processor having hardware, software, and/or firmware. The various method steps may be performed by modules, and the modules may comprise any of a wide variety of digital and/or analog data processing hardware and/or software arranged to perform the method steps described herein. The modules optionally comprising data processing hardware adapted to perform one or more of these steps by having appropriate machine programming code associated therewith, the modules for two or more steps (or portions of two or more steps) being integrated into a single processor board or separated into different processor boards in any of a wide variety of integrated and/or distributed processing architectures. These methods and systems will often employ a tangible media embodying machine-readable code with instructions for performing the method steps described above. Suitable tangible media may comprise a memory (including a volatile memory and/or a non-volatile memory), a storage media (such as a magnetic recording on a floppy disk, a hard disk, a tape, or the like; on an optical memory such as a CD, a CD-R/W, a CD-ROM, a DVD, or the like; or any other digital or analog storage media), or the like. The instructions or operations may be stored in the memory and executed by the processor, which causes the processor to perform the instructions or operations described.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. In certain cases, method steps or operations may be performed or executed in differing order, or operations may be added, deleted, or modified. It can be appreciated that, in certain aspects of the invention, a single component may be replaced by multiple components, and multiple components may be replaced by a single component, to provide an element or structure or to perform a given function or functions. Except where such substitution would not be operative to practice certain embodiments of the invention, such substitution is considered within the scope of the invention.

It is to be understood that the figures and descriptions of embodiments of the invention have been simplified to illustrate elements that are relevant for a clear understanding of the invention. Those of ordinary skill in the art will recognize, however, that these and other elements may be desirable. However, because such elements are well known in the art, and because they do not facilitate a better understanding of the invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the invention, a single component may be replaced by multiple components, and multiple components may be replaced by a single component, to provide an element or structure or to perform a given function or functions. Except where such substitution would not be operative to practice certain embodiments of the invention, such substitution is considered within the scope of the invention.

The examples presented herein are intended to illustrate potential and specific implementations of the invention. It can be appreciated that the examples are intended primarily for purposes of illustration of the invention for those skilled in the art. There may be variations to these diagrams or the operations described herein without departing from the spirit of the invention. For instance, in certain cases, method steps or operations may be performed or executed in differing order, or operations may be added, deleted, or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the claims.

All patents, patent publications, patent applications, journal articles, books, technical references, and the like discussed in the instant disclosure are incorporated herein by reference in their entirety for all purposes.

What is claimed is:

1. A method for using an authenticated, universal digital identity for a user, the method comprising:
   receiving, by a relying party, a first request from a user to sign up for access to the relying party using a digital identity of the user;
   providing, by the relying party, one or more identity providers for the user to select from;
   receiving, by the relying party, a selection from the user of a specific identity provider from the one or more identity providers;
   submitting, by the relying party, a second request to an identity network to retrieve identity attributes from the specific identity provider;
   receiving, by the relying party, the identity attributes from the identity network, the identity attributes originating from the specific identity provider, wherein the identity attributes are encrypted using a first encryption key;
   receiving a second encryption key from the specific identity provider that is used to decrypt the identity attributes; and
   providing the second encryption key to the identity network prior to receiving the identity attributes.

2. The method for using an authenticated, universal digital identity for a user of claim 1, further comprising:
   populating, by the relying party, one or more user information fields of a relying party application form of the relying party with the identity attributes.

3. The method for using an authenticated, universal digital identity for a user of claim 1, wherein:
   the method further comprises decrypting, by the relying party, the identity attributes.

4. The method for using an authenticated, universal digital identity for a user of claim 3, wherein:
   the identity attributes comprise additional information from a third party;
   the identity attributes and the additional information are encrypted using an additional key; and
   the method further comprises decrypting, by the relying party, the identity attributes and the additional information.

5. The method for using an authenticated, universal digital identity for a user of claim 1, wherein:
   the identity attributes comprise at least one attribute selected from a group consisting of a name of the user, a residential address of the user, an email address of the user, a telephone number of the user, and credit score of the user.

6. A relying party, comprising:
   one or more processors; and
   a memory having stored thereon instructions that, upon execution by the one or more processors, cause the one or more processors to:

receive a first request from a user to sign up for access to the relying party using a digital identity of the user;

provide one or more identity providers for the user to select from;

receive a selection from the user of a specific identity provider from the one or more identity providers;

submit a second request to an identity network to retrieve identity attributes from the specific identity provider; and receive the identity attributes from the identity network, the identity attributes originating from the specific identity provider, wherein the identity attributes are encrypted using a first encryption key;

receive a second encryption key from the specific identity provider that is used to decrypt the identity attributes; and provide the second encryption key to the identity network prior to receiving the identity attributes.

7. The relying party of claim 6, wherein the instructions further cause the one or more processors to:

enroll in a digital identity program of the identity network.

8. The relying party of claim 7, wherein:

enrolling in the digital identity program comprises integrating a software development kit provided by the identity network into a mobile application of the relying party.

9. The relying party of claim 6, wherein the instructions further cause the one or more processors to:

identify a token associated with the user for the specific identity provider; and use the token to identify the specific identity provider.

10. The relying party of claim 9, wherein:

the token is received from the user with the selection of the specific identity provider, the token is received from the specific identity provider, or the token is received from the identity network.

11. The relying party of claim 6, wherein the instructions further cause the one or more processors to:

populate one or more user information fields of a relying party application form of the relying party with the identity attributes.

12. The relying party of claim 6, wherein:

the instructions further cause the one or more processors to decrypt the identity attributes.

13. A non-transitory computer-readable medium having instructions stored thereon that, upon execution by one or more processors of a relying party, cause the one or more processors to:

receive a first request from a user to sign up for access to the relying party using a digital identity of the user;

provide one or more identity providers for the user to select from;

receive a selection from the user of a specific identity provider from the one or more identity providers;

submit a second request to an identity network to retrieve identity attributes from the specific identity provider; and receive the identity attributes from the identity network, the identity attributes originating from the specific identity provider, wherein the identity attributes are encrypted using a first encryption key;

receive a second encryption key from the specific identity provider that is used to decrypt the identity attributes; and provide the second encryption key to the identity network prior to receiving the identity attributes.

14. The non-transitory computer-readable medium of claim 13, wherein the instructions further cause the one or more processors to:

populate one or more user information fields of a relying party application form of the relying party with the identity attributes.

15. The non-transitory computer-readable medium of claim 13, wherein:

the instructions further cause the one or more processors to decrypt the identity attributes.

16. The non-transitory computer-readable medium of claim 15, wherein:

the identity attributes comprise additional information from a third party;

the identity attributes and the additional information are encrypted using an additional key; and the instructions further cause the one or more processors to decrypt the identity attributes and the additional information.

17. The non-transitory computer-readable medium of claim 13, wherein the instructions further cause the one or more processors to:

identify a token associated with the user for the specific identity provider; and use the token to identify the specific identity provider.

* * * * *